(No Model.) 2 Sheets—Sheet 1.

C. H. FISK.
DEVICE FOR SUSPENDING AND SUPPORTING TROLLEY WIRES.

No. 564,984. Patented Aug. 4, 1896.

Witnesses
M. L. Fisher
K. Smith

Inventor
Charles H. Fisk,
per Wm. Hubbell Fisher,
Attorney (No Model.) 2 Sheets—Sheet 2.
C. H. FISK.
DEVICE FOR SUSPENDING AND SUPPORTING TROLLEY WIRES.
No. 564,984. Patented Aug. 4, 1896.
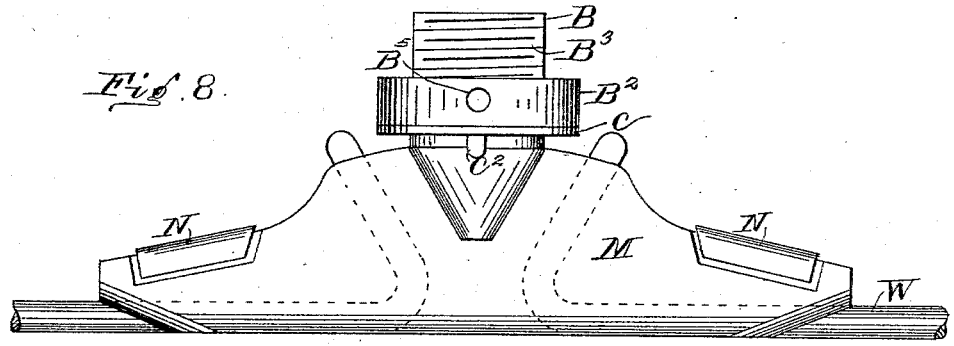
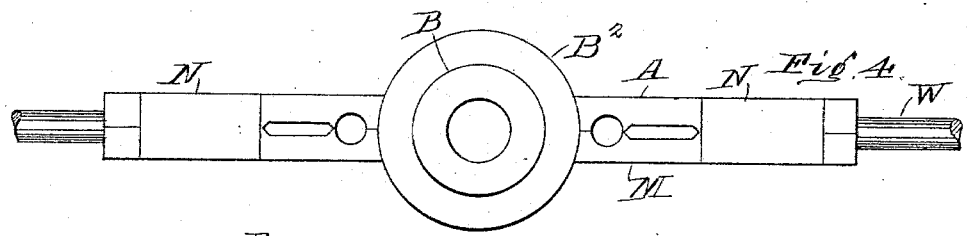
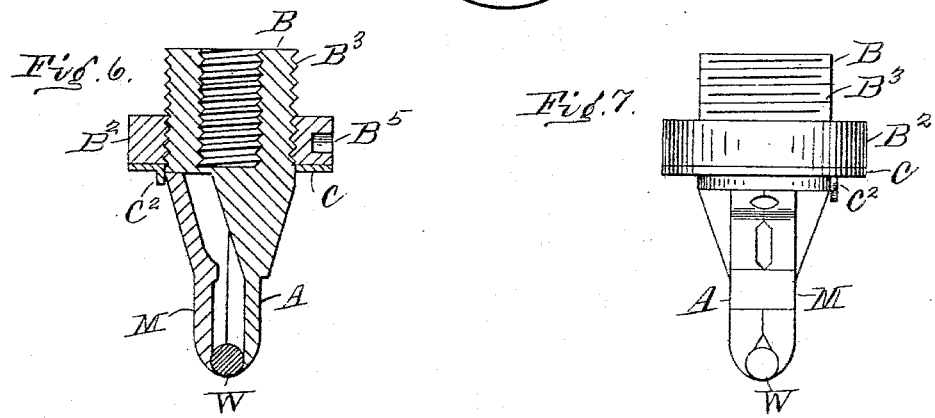
Witnesses
M. L. Fisher
K. Smith
Inventor
Charles H. Fisk
per Wm. Hubbell Fisher,
Attorney

UNITED STATES PATENT OFFICE.

CHARLES H. FISK, OF WASHINGTON COURT-HOUSE, OHIO.

DEVICE FOR SUSPENDING AND SUPPORTING TROLLEY-WIRES.

SPECIFICATION forming part of Letters Patent No. 564,984, dated August 4, 1896.

Application filed February 23, 1895. Serial No. 539,372. (No model.)

*To all whom it may concern:*

Be it known that I, CHARLES H. FISK, a citizen of the United States, and a resident of Washington Court-House, in the county of Fayette and State of Ohio, have invented certain new and useful Improvements in Devices for Suspending and Supporting Trolley-Wires and their Connections, of which the following is a specification.

The several features of my invention and the various advantages resulting from their use, conjointly or otherwise, will be apparent from the following description and claims.

Figure 1:
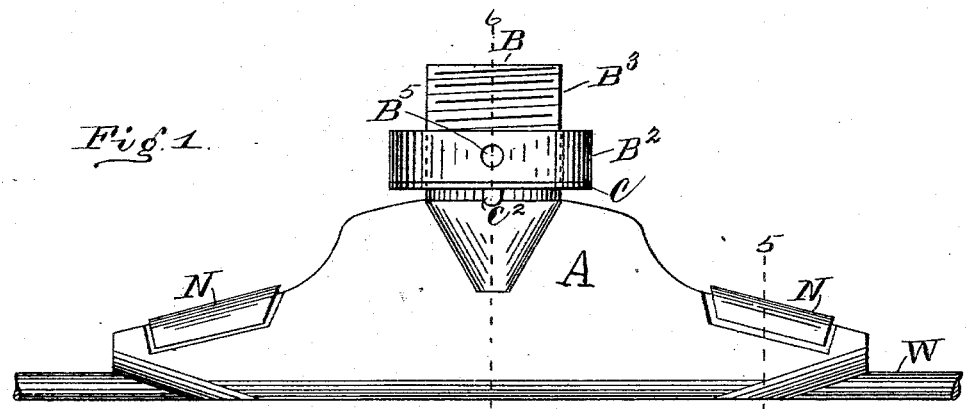
Figure 2:
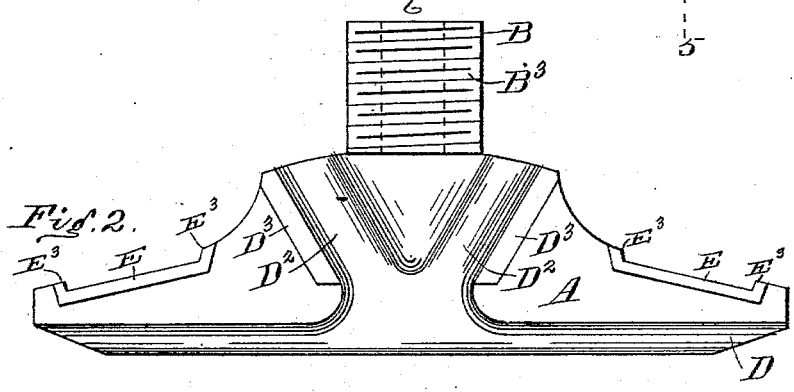
Figure 3:
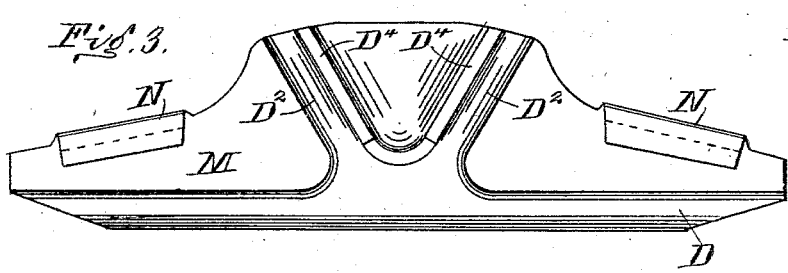
Figure 5:
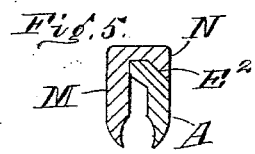

In the accompanying drawings, making a part of this application, in which similar letters of reference indicate corresponding parts, Figure 1 is a side elevation of the complete device embodying my invention. Fig. 2 is an elevation of the inner side of that portion of the device whose outside elevation is the prominent one shown in Fig. 1. Fig. 3 is an inner elevation of that part which is complementary to the part shown more fully in Figs. 1 and 2. Fig. 4 is a top view of the device when locked together, as shown in Fig. 1. Fig. 5 represents a vertical transverse section taken in the plane of the dotted line 5 5 of Fig. 1, that face of the section being seen which faces toward the right in Fig. 1. Fig. 6 represents a vertical transverse section taken in the plane of the dotted line 6 6 of Fig. 1, that face of the section being seen which faces toward the left hand in Fig. 1. Fig. 7 indicates an end elevation of that end of the device which is at the right hand in Fig. 1. Fig. 8 illustrates how the ends of a spliced wire are fastened and held in the holder.

The device in general consists of two main divisions or halves and a washer, all of novel construction, the whole so formed that in connection with a means to tighten the collar on the washer the device will tightly grasp the trolley or other wire it is designed to support.

The advantages of my invention will be fully set forth hereinafter.

A indicates one of the main divisions or halves. This division is provided centrally at its upper portion with the insulator-holder B, rigidly fixed thereto and preferably cast in one therewith. In the center of the holder B is an orifice, interiorly screw-threaded, into which the stem of the insulator is screwed. This insulator may be of any suitable kind, and serves to suspend and support the entire device, (which is the subject of my invention.) As this insulator is well known, and its various forms and its mode of suspension are well known and in common use, further mention of the construction of it is deemed unnecessary.

The holder B has an exterior screw-thread $B^3$. A nut $B^2$ encircles the holder and engages said screw-thread. The nut $B^2$ is formed so that it can be engaged by suitable device and turned. In the present illustrative instance the nut has a recess $B^5$ to receive a rod, or the tooth of a wrench whereby the nut can be rotated.

Around the holder B is a collar or washer C, capable of being readily slid up and off the holder B or returned to place thereon. A principal feature of this washer is the downwardly-extending lug or teat $C^2$, secured thereto. The function of this lug will be hereinafter described.

On the inside of the lower edge portion of division A is a hollow groove D, deep enough to receive a part (about a third of the periphery) of a trolley-wire W.

The top edge of the part A, on each side of the central holder B, is beveled downwardly and outwardly, as shown, to respectively afford a convenient and wedge-tightening hold for the adjacent hooks of the second or complementary main division M. This bevel $E^2$ lies in a notch or depression E, whose ends $E^3$ act as abutments to prevent the hooks N of division M from slipping laterally. The inner edges of the notch E extend out inwardly from the inner face of division A for an obvious reason—viz., to keep the main divisions a given distance apart for a purpose hereinafter mentioned. The second main division M carries a groove D, located therein similarly to that of groove D of division A, and of about the same depth as said groove.

In each of the complementary portions A and M are the recesses $D^2 D^2$, respectively, beginning at each side of the holder B and running downward and converging and connecting with the lower horizontal recess D. On one of the parts A are the ribs or raised portions $D^3$ on the outer sides of said recesses $D^2$, and on the other of the parts M are the ribs $D^4 D^4$. When the parts A and M are brought together, the recesses $D^2$ and ribs $D^3 D^4$ together form converging ways or channels, connected with the channel D, and large enough to receive the trolley-wire.

I will now describe the operation of my invention. The part A has a boss or holder B, threaded internally, as shown in Fig. 6, to screw onto a suitable insulator, which is suspended by beams, ligaments, &c., from a suitable support. The nut $B^2$ is now screwed upward on the holder B. The other complementary main piece M is now connected to the main piece A, the hooks N of the latter being hooked over the bevels $E^2$ of the notched depressions E, the trolley-wire W being elevated and brought into the grooves D of the parts A and M as the latter are closed together. The washer C is now adjusted so that it rests down on both the parts A and M, and its teat or lug $C^2$ lies outside of part M, and in connection with the hooks N prevents the latter from separating from part A even when the nut $B^2$ is not screwed down and tightened thereon. The nut $B^2$ is now screwed down, and the entire device tightly holds the trolley-wire in place and upholds it at this desired location.

My invention is of great benefit and advantage in supporting a trolley-wire that has been broken or is in two pieces—viz., by supporting and splicing, so to speak, the ends of said wire. To accomplish this last-named function, I take the end of one of the wire-sections and bend it back and place the main part of the wire of one section in the right-hand portion of said section in the right-hand groove $D^2$ of part A. I likewise bend back the end of the other section and place the main portion of the latter section in the left-hand portion of the recess D and the bent portion of said section in the left-hand groove $D^2$. The complementary part M is now adjusted to the part A and secured thereto, as aforementioned. Thus a wire, whether broken or in sections, will be spliced, made electrically one, and be well supported, all in an easy and expeditious manner. Should the nut $B^2$ become loosened for any reason, the lug $C^2$ of washer C will hold the two halves A and M together and retain the trolley-wire in position in my supporting device.

It will be noted that when the nut or collar $B^2$ is screwed down on the washer it bears on the top of the detachable half M, and the downward pressure of the nut tends to force the lower portions of the halves A and M together and spread the upper portions and grip the wire tight.

To use the support as a feeder, the feeder-wire can be placed between the collar and the washer around the stem and fastened firmly while the lower portion of the device supports a wire.

The device is preferably made of brass, so as to form a good conductor, in case of splicing, or when used as a feeder, but can be made of malleable iron.

There is in existence the common ear, which is fastened together with two or more screws to hold the plates on, which are merely supports for a line. In case of a breakage at the support it has to be taken down and replaced by a splice-ear, necessitating, of course, delay in repairs. There are others called the "soldered ear," which necessitate the soldering of the wire to the lower edge, on the ends of which are two small points bent around the wire to hold it in place while the soldering operation is going on. In case of breakage of wire near the ear it occasions considerable delay in repairs, as it has to be unsoldered and replaced by another style of splice-ear, to which the wire has to be resoldered again.

The action of the trolley-wheel passing the ends of all ears causes a sparking, which causes the wire to break very close to the ends. The sparking is common to all ears, and the majority of breaks, therefore, are close to the ends of the ears, and in that case, where my device is in use, by loosening the collar on the next support adjoining the wire can be slipped through, drawn up far enough to form the bend, in the same ear that was used previously as support and make splice, while if the soldered ear was used it would have to be unsoldered and a new ear put in, as in the majority of cases the wire will stretch more or less from service, which ordinarily is enough to form end enough to make a splice.

The purpose of the nut $B^2$ is to clamp, as heretofore mentioned. This clamp may be of a different kind, although I prefer nut $B^2$ and screw $B^3$ on the collar.

What I claim as new and of my invention, and desire to secure by Letters Patent, is—

1. In an electric-wire supporter, the combination of the two main pieces A and M, and the washer C, $C^2$, the detachable half held in place by the small projection on the washer, substantially as and for the purposes specified.

2. In an electric-wire supporter, the portion A carrying the holder B, screw-threaded and nut $B^2$ screwed thereon, and a portion M having hooks N to engage the portion A, and means for enabling the parts A and M to hold the wire, substantially as and for the purposes specified.

3. In an electric-wire supporter, the two portions A and M, the one carrying the holder B and a tightening device, and the bevels $E^2$ and the other carrying the hooks N, for engaging said bevels, the construction as described enabling the tightener to close the lower lips or jaws of the device upon the electric wire, substantially as and for the purposes specified.

4. In an electric-wire supporter, the two portions A and M, combined with supporting-holder B, and beveled sides on portion A, in notched depressions E, E³, and hooks N on portion M, for engaging said bevels within said depressions, and tightening device for pressing part M down upon part A, substantially as and for the purposes specified.

5. In an electric-wire supporter, the two portions A and M, combined with supporting-holder B, and beveled sides on portion A, in notched depressions E, E³, and hooks N on portion M for engaging said bevels within said depressions, collar C with lug C² on holder B, and tightening device for pressing collar C down on part M and the latter down upon part A, substantially as and for the purposes specified.

6. In an electric-wire supporter, the two portions A and M, and ridges D³ and D⁴ inclined at angles to the lower edge or groove D of the device, and means for approximating and holding in conjunction the parts A and M, substantially as and for the purposes specified.

7. In a device for supporting electric wires, the combination of pieces A and M, each provided with projections forming grooves or holding devices, one groove D of these grooves being horizontal, and the others being at an angle thereto, these angular grooves diverging from below upward and respectively running upward, the part A being provided with the vertical screw-threaded holder B and a clamp for holding the part A to part M, and a nut as B² for retaining the clamp in place, the clamp being located between the ends of the said grooves, if extended, substantially as and for the purposes specified.

8. In a device for supporting electric wires, the combination of pieces A and M, one having the holder B, and tightening device B² and each provided with projections forming grooves or holding devices, one groove D of these grooves being horizontal, and the others being at an angle thereto, these angular grooves diverging from below upward and diverging to each side of the holder and separate from the latter, substantially as and for the purposes specified.

9. In combination, the part A having holder B and screw-nut B², and collar C with lug C², and notched depressions E, E³, and beveled faces E² in said depressions, and inclined ridges D⁴, D⁴, and horizontal groove D, and the part M having hooks N for engaging said bevels, and inclined ridges D³, D³, and horizontal groove D, substantially as and for the purposes specified.

10. In an electric-wire supporter, the combination of the two main pieces A and M, and the washer C, C², the detachable half held in place by the small projection on the washer, and nut B², for holding down the collar, and grasping feeder-wire between it and said collar, substantially as and for the purposes specified.

11. In combination, part A having a supporting-hanger B, and collar C with lug C², and nut B² on the hanger above collar C, the parts A and M being provided with means, as grooves, or the like, angulated and horizontal, substantially as and for the purposes specified.

CHARLES H. FISK.

Attest:
C. A. REID,
MOSES GROSS.